(No Model.)
F. H. PALMER.
COVER FASTENING FOR JARS.
No. 373,248. Patented Nov. 15, 1887.
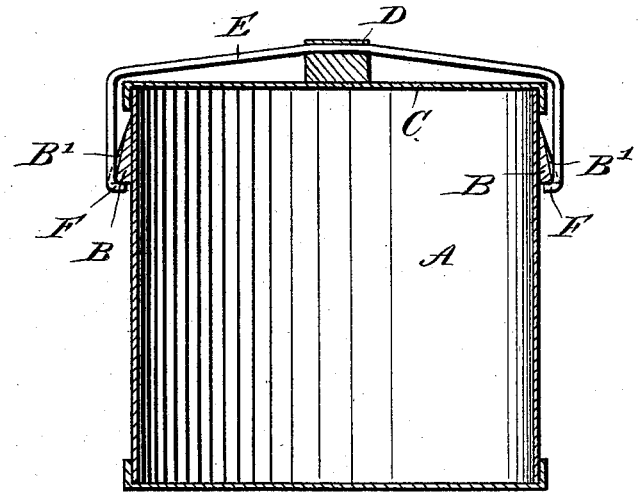
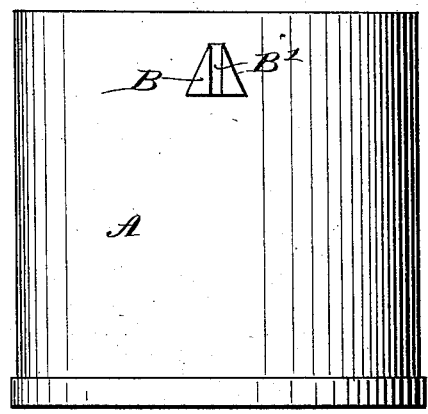
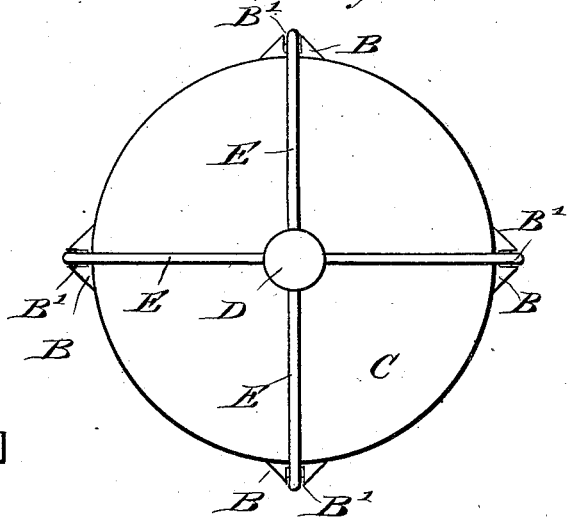
WITNESSES:
INVENTOR:
F. H. Palmer
BY Munn & Co.
ATTORNEYS.

UNITED STATES PATENT OFFICE.

FRANK H. PALMER, OF LONG ISLAND CITY, NEW YORK, ASSIGNOR OF ONE-HALF TO CHESTER HUNTINGTON, OF SAME PLACE.

COVER-FASTENING FOR JARS.

SPECIFICATION forming part of Letters Patent No. 373,248, dated November 15, 1887.

Application filed April 12, 1887. Serial No. 234,510. (No model.)

*To all whom it may concern:*

Be it known that I, FRANK H. PALMER, of Long Island City, in the county of Queens and State of New York, have invented a new and Improved Cover-Fastening for Jars and Casings, of which the following is a full, clear, and exact description.

The object of my invention is to provide a new and improved cover-fastening which is simple and durable in construction and holds very securely the cover to the jar or casing.

My invention consists in the construction, arrangement, and combination of parts and details, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of a metallic casing provided with my improvement. Fig. 2 is a side elevation of the casing. Fig. 3 is a plan view of a modified form of my improvement.

My invention is specially adapted for fruit-jars or metallic casings containing paint or other substances.

In the drawings is represented a metallic casing, A, provided on two or more opposite sides, near the top, with the wedge-shaped lugs or projections B, each having a vertical groove, B', on its outer face.

The lid or cover C, which fits on the mouth of the casing A, is provided in its center on top with a post or bracket, D, to which are secured one or more metallic springs, E, of an inverted-U shape and extending at their outer ends to the side of the casing A. The extreme ends of each spring E are slightly bent inward to form the catches F.

The lid or cover C is fastened to the casing A by placing the lid or cover C on the mouth of the casing A, so that the ends of the springs E are in line with the grooves B' of the wedge-shaped lugs B. The operator then presses the ends of the springs E downward until the catches F pass under the lower ends of the lugs B, thus holding the springs E securely in position, and the cover or lid C firmly in place on the mouth of the casing A.

It will be seen that the cover or lid C is pressed with a force against the casing A equal to the upward pressure of the springs E. In Figs. 1 and 2, I represent a jar and cover with one spring E, and in Fig. 3 is represented a cover with two springs E, placed at right angles to each other. Any number of springs may be employed and a corresponding number of lugs B formed on the casing. The cover or lid C can be removed by pressing the catches F outwardly with a prying-tool or other means.

The post D elevates the springs E sufficiently so as to prevent them from coming in contact with the cover.

Having thus described my invention, what I claim as new, and desire to secure by Letters Patent, is—

1. The combination, with a jar or casing provided on opposite sides with wedge-shaped lugs, each having a groove, of a cover provided with a central post supporting a U-shaped spring or springs provided at their ends with inwardly-extending catches adapted to engage the lower ends of the said lugs, substantially as described.

2. The combination, with a jar or casing provided on opposite sides with wedge-shaped lugs having each a groove and a cover adapted to said jar or casing, of U-shaped springs centrally supported from said cover and provided at their ends with catches, substantially as set forth.

FRANK H. PALMER.

Witnesses:
EDGAR TATE,
C. SEDGWICK.